US010724624B2

(12) United States Patent
Tulokas

(10) Patent No.: US 10,724,624 B2
(45) Date of Patent: Jul. 28, 2020

(54) PLANET WHEEL CARRIER FOR A PLANETARY GEAR

(71) Applicant: Moventas Gears Oy, Jyväskylä (FI)

(72) Inventor: Janne Tulokas, Jyväskylä (FI)

(73) Assignee: MOVENTAS GEARS OY, Jyväskylä (FI)

( * ) Notice: Subject to any disclaimer, the term of this patent is extended or adjusted under 35 U.S.C. 154(b) by 158 days.

(21) Appl. No.: 15/852,423

(22) Filed: Dec. 22, 2017

(65) Prior Publication Data
US 2018/0187719 A1 Jul. 5, 2018

(30) Foreign Application Priority Data

Jan. 2, 2017 (EP) .................................... 17150015

(51) Int. Cl.
*F16H 57/04* (2010.01)
*F16H 57/08* (2006.01)

(52) U.S. Cl.
CPC ..... *F16H 57/0479* (2013.01); *F16H 57/0434* (2013.01); *F16H 57/082* (2013.01); *F16H 2057/085* (2013.01)

(58) Field of Classification Search
CPC ...... F16H 57/04; F16H 57/0479; F16H 57/08; F16H 57/082; F16H 2057/085
See application file for complete search history.

(56) References Cited

U.S. PATENT DOCUMENTS

| 3,763,961 A | * | 10/1973 | Casale | ................... | B63H 21/30 |
| | | | | | 184/11.2 |
| 4,441,570 A | * | 4/1984 | Damm | ...................... | F16H 1/28 |
| | | | | | 180/9.62 |
| 4,771,654 A | * | 9/1988 | Shinjo | ................... | F16H 1/2836 |
| | | | | | 475/31 |
| 2012/0108380 A1 | | 5/2012 | Dinter et al. | | |

(Continued)

FOREIGN PATENT DOCUMENTS

| CN | 200986016 Y | * | 12/2007 |
| CN | 202082374 U | | 12/2011 |

(Continued)

OTHER PUBLICATIONS

European Search Report for EP 17 15 0015, dated Jun. 29, 2017.
European Office Action, dated Jan. 27, 2020, for European Application No. 17150015.0.

*Primary Examiner* — David R Morris
(74) *Attorney, Agent, or Firm* — Birch, Stewart, Kolasch & Birch, LLP

(57) ABSTRACT

A planet wheel carrier for a planetary gear includes a carrier body for supporting shafts of planet wheels and a slide bearing for rotatably supporting a first end of the carrier body with respect to a frame of the planetary gear. The carrier body includes oil channels for conducting oil to bearings of the planet wheels. The slide bearing includes an oil channel for conducting oil from an oil channel of the frame to the oil channels of the carrier body. The planet wheel carrier includes one or more conical roller bearings (Continued)

for rotatably supporting a second end of the carrier body with respect to the frame. Thus, the slide bearing conducts pressurized oil to the rotating planet wheel carrier whereas the conical roller bearings receive axial forces directed to the planet wheel carrier.

12 Claims, 3 Drawing Sheets

(56) References Cited

U.S. PATENT DOCUMENTS

| 2015/0330498 | A1* | 11/2015 | Carlino | F16H 57/0479 |
| | | | | 475/159 |
| 2016/0319927 | A1 | 11/2016 | Shirokoshi | |
| 2016/0327148 | A1* | 11/2016 | Dinter | F16H 57/08 |

FOREIGN PATENT DOCUMENTS

| CN | 202851909 U | 4/2013 |
| CN | 105202169 A | 12/2015 |
| DE | 10 2004 046 472 A1 | 4/2006 |
| DE | 10 2015 112 110 A1 | 11/2016 |
| EP | 2 383 480 A1 | 11/2011 |
| WO | WO 03/029696 A1 | 4/2003 |

* cited by examiner

PLANET WHEEL CARRIER FOR A PLANETARY GEAR

FIELD OF THE DISCLOSURE

The disclosure relates to a planet wheel carrier for a planetary gear. Furthermore, the disclosure relates to a planetary gear.

BACKGROUND

A planetary gear comprises a planet wheel carrier, a sun shaft, a gear ring, and planet wheels supported by the planet wheel carrier so that the planet wheels are meshing with the sun shaft and with the gear ring. Bearings of the planet wheels can be splash lubricated so that the bearings are surrounded by droplets of oil when the planetary gear is operating. It is also possible that the bearings are lubricated with pressure-feed lubrication so that the planet wheel carrier comprises oil channels for conducting oil to the bearings. The pressure-feed lubrication is advantageous because an oil circulation path that comprises the above-mentioned oil channels can be provided with an oil filter so as to keep the oil clean. Furthermore, the oil circulation path can be provided with temperature control means for controlling the temperature of the oil to be in a desired temperature range. Furthermore, the above-mentioned oil channels can be designed so that the oil is directed to most critical places in the bearings and other parts of the planetary gear.

An inherent challenge related to pressure-feed lubrication of the kind mentioned above is the need to supply oil from a stationary part of a planetary gear to a rotating planet wheel carrier. On one hand, oil leakage which takes place in an oil supply connection between the stationary part and the rotating planet wheel carrier should be so small that sufficient oil pressure can be maintained in oil channels of the planet wheel carrier. On the other hand, an oil supply connection where the leakage is sufficiently small has its own challenges. In cases where the oil supply connection is contactless, clearances of the oil supply connection between the stationary part and the rotating planet wheel carrier have to be small and thus there is a risk of unintentional mechanical contacts which may damage the surfaces touching each other. In cases where the oil supply connection comprises a seal element having mechanical contacts with both the stationary part and the rotating planet wheel carrier, the seal element may increase the need for maintenance work and thereby the operating costs of the planetary gear.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the present invention, there is provided a new planet wheel carrier for a planetary gear. A planet wheel carrier according to the invention comprises:
- a carrier body for supporting the shafts of the planet wheels of the planetary gear, the carrier body and the shafts of the planet wheels comprising oil channels for conducting oil to bearings of the planet wheels,
- a slide bearing for rotatably supporting a first end of the carrier body with respect to a frame of the planetary gear, and
- one or more conical roller bearings for rotatably supporting a second end of the carrier body with respect to the frame of the planetary gear and for receiving an axial force directed to the carrier body.

The slide bearing comprises at least one oil channel for conducting oil from at least one oil channel of the frame of the planetary gear to the oil channels of the carrier body.

The above-mentioned slide bearing is not only a bearing but also an oil supply connection from the frame to the planet wheel carrier whereas the one or more conical roller bearings receive both radial and axial forces thus allowing the slide bearing to be simple and cost effective. The arrangement comprising the slide bearing and the above-mentioned oil channels is suitable for implementing pressure-feed lubrication for the bearings of the planet wheels. The pressure-feed lubrication is advantageous especially when the bearings of the planet wheels are slide bearings.

In accordance with the present invention, there is provided also a new planetary gear that comprises:
- a sun shaft,
- a gear ring,
- planet wheels, and
- a planet wheel carrier according to the invention for supporting the planet wheels so that the planet wheels are meshing with the sun shaft and with the gear ring.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1:
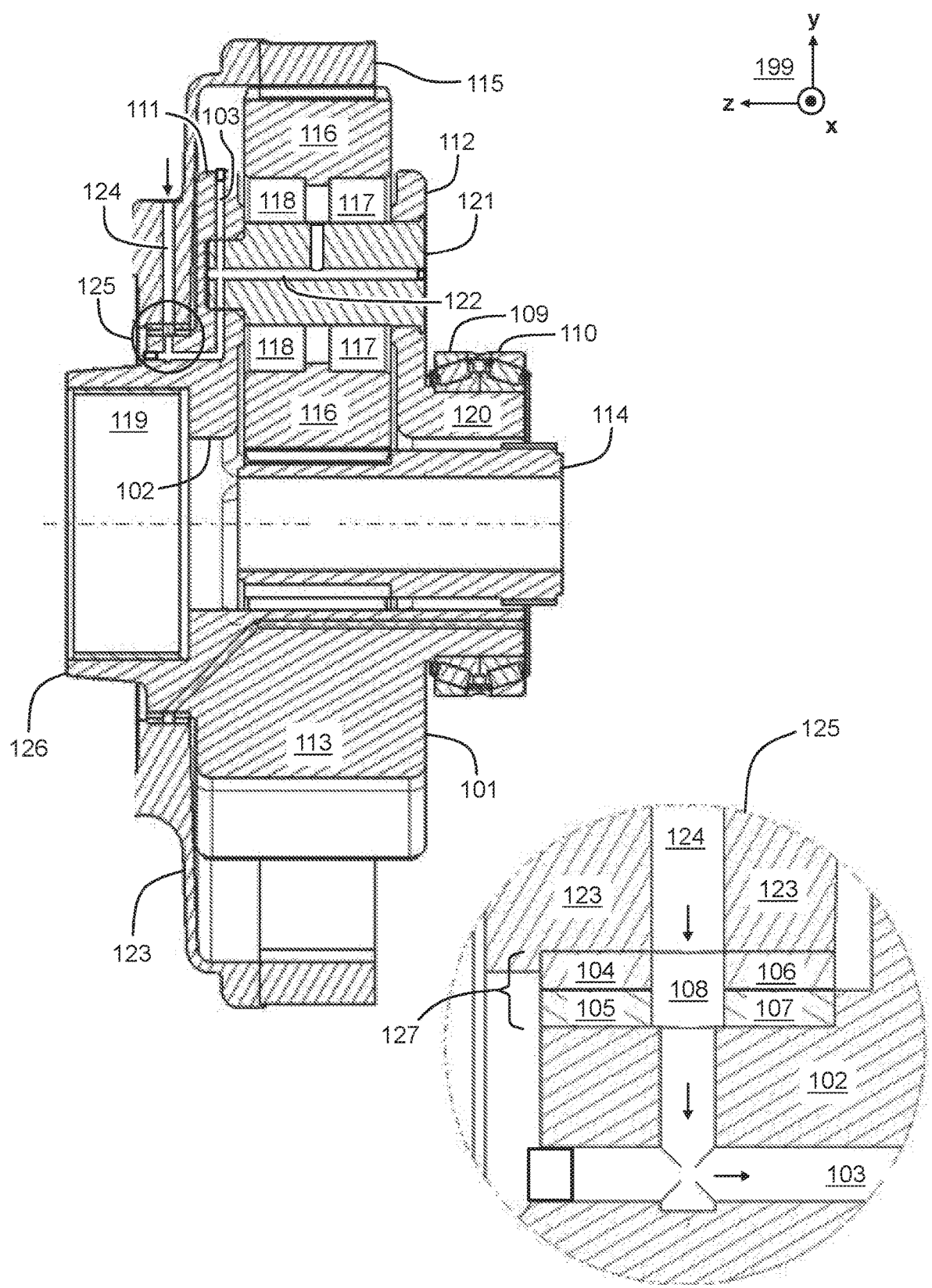
FIG. 1 illustrates a planetary gear according to an exemplifying and non-limiting embodiment of the invention.

FIG. 1 shows a section view of a planetary gear according to an exemplifying and non-limiting embodiment of the invention. The section is taken along a section plane which is parallel with the yz-plane of a coordinate system 199 and which coincides with the geometric center line of the of the planetary gear. In FIG. 1, the geometric center line is depicted with a dash-and-dot line. The planetary gear comprises a sun shaft 114, a gear ring 115, planet wheels, and a planet wheel carrier 101 according to an exemplifying and non-limiting embodiment of the invention for supporting the planet wheels so that the planet wheels are meshing with the sun shaft 114 and with the gear ring 115. FIG. 1 shows a section view of one of the planet wheels. The planet wheel shown in FIG. 1 is denoted with a reference 116. The number of the planet wheels can be for example 3, 4, 5, or 6. Increasing the number of the planet wheels decreases torque transferred by each planet wheel and thereby smaller gear teeth are sufficient to transfer the torque. Another way to see the effect of increasing the number of the planet wheels is that increasing the number of the planet wheels increases the amount of those of the gear ring teeth and correspondingly the amount of those of the planet wheel teeth as well as the amount of those of the sun shaft teeth which, at each moment of time, are involved in torque transfer. In many cases, the outer diameter of the gear ring 115 can be smaller when there are e.g. five planet wheels than when there are e.g. four or three planet wheels.

The planet wheel carrier 101 comprises a carrier body 102 for supporting the shafts of the planet wheels. FIG. 1 shows a section view of the shaft of the planet wheel 116. The shaft shown in FIG. 1 is denoted with a reference 121. The carrier body 102 comprises a connection section 126 that can be connected to an external mechanical system that can be, for example but not necessarily, a rotor of a wind turbine. The carrier body 102 comprises a first end-section 111 for supporting first ends of the shafts of the planet wheels and a second end-section 112 for supporting second ends of the shafts of the planet wheels. In this exemplifying case, the carrier body 102 comprises a support structure 113 that connects the first and second end-sections 111 and 112 to each other in order to increase the mechanical stiffness of the carrier body 102. The support structure 113 is located between the first and second end-sections 111 and 112 in the axial direction and between the planet wheels in the circumferential direction of the planet wheel carrier 101. The axial direction is parallel with the z-axis of the coordinate system 199.

The carrier body 102 and the shafts of the planet wheels comprise oil channels for conducting oil to the bearings of the planet wheels. In FIG. 1, an oil channel of the carrier body 102 is denoted with a reference 103, an oil channel of the shaft 121 of the planet wheel 116 is denoted with a reference 122, and the bearings of the planet wheel 116 are denoted with references 117 and 118. In the exemplifying planetary gear illustrated in FIG. 1, the bearings of the planet wheels are cylindrical roller bearings. The planet wheel carrier 101 comprises a slide bearing 127 for rotatably supporting a first end 119 of the carrier body 102 with respect to a frame 123 of the planetary gear. FIG. 1 shows a magnified view of a figure portion 125 so as to illustrate the slide bearing 127. The slide bearing 127 comprises an oil channel 108 for conducting oil from an oil channel 124 of the frame 123 to the oil channel 103 of the carrier body 102. A part of the oil supplied via the oil channel 124 of the frame 123 lubricates the slide bearing 127 and the rest of the oil is delivered to the planet wheel carrier 101 and thereby to the bearings of the planet wheels. Therefore, the slide bearing 127 is used as an oil supply connection which enables pressurized oil supply to the bearings of the planet wheels. The planet wheel carrier 101 comprises conical roller bearings for rotatably supporting a second end 120 of the carrier body 102 with respect to the frame 123. The conical roller bearings are capable of receiving axial forces directed to the carrier body 102. Therefore, the slide bearing 127 that supports the first end 119 of the carrier body 102 can be simple and cost effective. In this exemplifying case, the conical roller bearings comprise axially successive first and second conical roller bearings 109 and 110 whose coning angles open towards each other. Thus, the combination of the conical roller bearings 109 and 110 is capable of receiving axial forces which have the positive z-direction of the coordinate system 199 as well as axial forces which have the negative z-direction of the coordinate system 199. In cases where the axial force directed to the planet wheel carrier 101 is constantly non-zero and cannot change its direction, only one conical roller bearing may suffice. A situation of the kind mentioned above may take place when the axial direction is substantially vertical and the axial force directed to the planet wheel carrier 101 is mainly caused by the gravity.

In the exemplifying case illustrated in FIG. 1, the slide bearing 127 comprises two axially successive bearing elements so that there is an axial gap between the bearing elements. As shown by the magnified view of the figure portion 125, the axial gap constitutes the oil channel 108 for conducting oil from the oil channel 124 of the frame 123 to the oil channel 103 of the carrier body 102. One of the axially successive bearing elements comprises bearing bushes 104 and 105 and the other one of the bearing elements comprises bearing bushes 106 and 107. The bearing bushes 104-107 can be according to known slide bearing technology. For example, the bearing bushes 104 and 106 can be made of material that is softer than the material of the bearing bushes 105 and 107. It is, however, also possible that the bearing bushes 105 and 107 are made of material that is softer than the material of the bearing bushes 104 and 106. The softer material can be for example white metal and the harder material can be for example steel. It is also possible that the bearing bushes 104 and 106, or the bearing bushes 105 and 107, are multilayer bearing bushes each of which comprises a backing made of e.g. steel, one or more intermediate layers made of one or more suitable materials that are softer than the material of the backing, and a surface coating for providing appropriate sliding properties and wear resistance. It is also possible that a surface of the carrier body 102 is adapted to act as a siding surface and each of the axially successive bearing elements comprises only one bearing bush. It is, however, advantageous that all sliding surfaces of the slide bearing 127 are implemented with replaceable components such as the bearing bushes 104-107.

Figure 2:
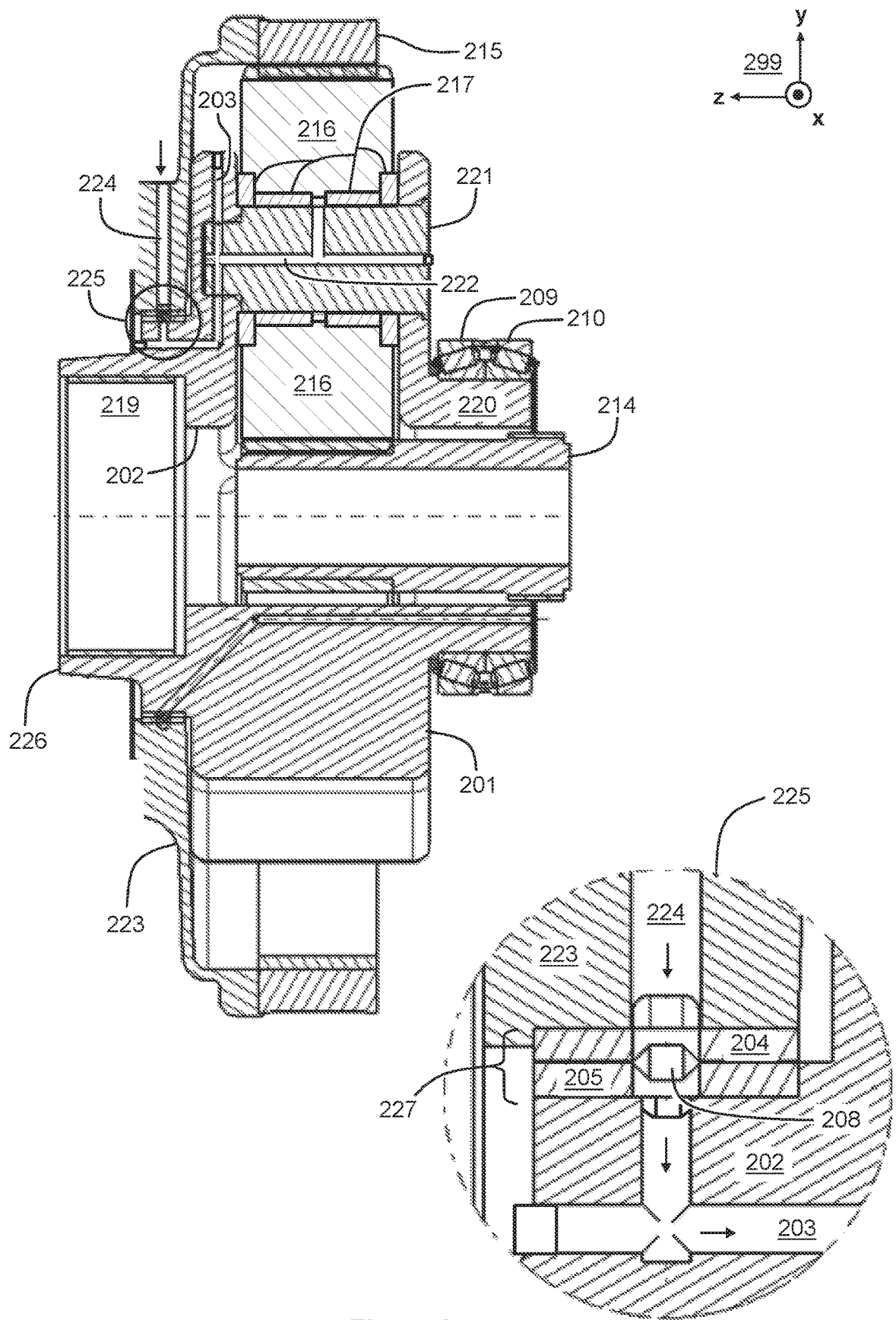
FIG. 2 illustrates a planetary gear according to an exemplifying and non-limiting embodiment of the invention.

FIG. 2 shows a section view of a planetary gear according to an exemplifying and non-limiting embodiment of the invention. The section is taken along a section plane which is parallel with the yz-plane of a coordinate system 299 and which coincides with the geometric center line of the of the planetary gear. In FIG. 2, the geometric center line is depicted with a dash-and-dot line. The planetary gear comprises a sun shaft 214, a gear ring 215, planet wheels, and a planet wheel carrier 201 according to an exemplifying embodiment of the invention for supporting the planet wheels so that the planet wheels are meshing with the sun shaft 214 and with the gear ring 215. FIG. 2 shows a section view of one of the planet wheels. The planet wheel shown in FIG. 2 is denoted with a reference 216.

The planet wheel carrier 201 comprises a carrier body 202 for supporting the shafts of the planet wheels. FIG. 2 shows a section view of the shaft of the planet wheel 216. The shaft shown in FIG. 2 is denoted with a reference 221. The carrier body 202 comprises a connection section 226 that can be connected to an external mechanical system that can be, for example but not necessarily, a rotor of a wind turbine. The carrier body 202 and the shafts of the planet wheels comprise oil channels for conducting oil to the bearings of the planet wheels. In FIG. 2, an oil channel of the carrier body 202 is denoted with a reference 203, an oil channel of the shaft 221 of the planet wheel 216 is denoted with a reference 222, and the bearings of the planet wheel 216 are denoted with a reference 217. In the exemplifying planetary gear illustrated in FIG. 2, the bearings of the planet wheels are slide bearings which comprise radial slide bearing sections and axial slide bearing sections. The slide bearings of the planet wheels can be according to known slide bearing technology. The slide bearings of the planet wheels make it possible to reduce the diameters of the sun shaft 214, the planet wheels, and the gear ring 215 compared to a planetary gear whose planet wheels are supported with rolling bearings because slide bearings need less room in the radial direction than rolling bearings with the same bearing capacity would do.

The planet wheel carrier 201 comprises a slide bearing 227 for rotatably supporting a first end 219 of the carrier body 202 with respect to a frame 223 of the planetary gear. FIG. 2 shows a magnified view of a figure portion 225 so as to illustrate the slide bearing 227. The slide bearing 227 comprises oil channels 208 for conducting oil from an oil channel 224 of the frame 223 to the oil channel 203 of the carrier body 202. A part of the oil supplied via the oil channel 224 of the frame 223 lubricates the slide bearing 227 and the rest of the oil is delivered to the planet wheel carrier 201 and thereby to the slide bearings of the planet wheels. Therefore, the slide bearing 227 is used as an oil supply connection which enables pressurized oil supply to the slide bearings of the planet wheels. The planet wheel carrier 201 comprises conical roller bearings for rotatably supporting a second end 220 of the carrier body 202 with respect to the frame 223. The conical roller bearings are capable of receiving axial forces directed to the carrier body 202. Therefore, the slide bearing 227 that supports the first end 219 of the carrier body 202 can be simple and cost effective. In this exemplifying case, the conical roller bearings comprise axially successive first and second conical roller bearings 209 and 210 whose coning angles open towards each other. Thus, the combination of the conical roller bearings 209 and 210 is capable to receive axial forces which have the positive z-direction of the coordinate system 299 as well as axial forces which have the negative z-direction of the coordinate system 299.

In the exemplifying case illustrated in FIG. 2, the sliding surfaces of the slide bearing 227 comprise circumferential grooves and the slide bearing 227 comprises radial apertures for conducting oil from the channel 224 of the frame 223 to the circumferential grooves and for conducting oil from the circumferential grooves to the oil channel 203 of the carrier body 202. It is also possible that only one of the sliding surfaces of the slide bearing 227 comprises a circumferential groove. As shown by the magnified view of the figure portion 225, the circumferential grooves and the radial apertures of the slide bearing 227 constitute the oil channels 208 for conducting oil from the oil channel 224 of the frame 223 to the oil channel 203 of the carrier body 202. The slide bearing 227 comprises bearing bushes 204 and 205. The bearing bushes 204 and 205 can be according to known slide bearing technology. For example, the bearing bush 204 can be made of material that is softer than the material of the bearing bush 205. It is, however, also possible that the bearing bush 205 is made of material that is softer than the material of the bearing bush 204. The softer material can be for example white metal and the harder material can be for example steel. It is also possible that the bearing bush 204, or the bearing bush 205, is a multilayer bearing bush which comprises a backing made of e.g. steel, one or more intermediate layers made of one or more suitable materials that are softer than the material of the backing, and a surface coating for providing appropriate sliding properties and wear resistance. It is also possible that a surface of the carrier body 202 is adapted to act as a siding surface and the slide bearing 227 comprises only one bearing bush 204. It is, however, advantageous that both sliding surfaces of the slide bearing 227 are implemented with replaceable components such as the bearing bushes 204 and 205.

Figure 3:
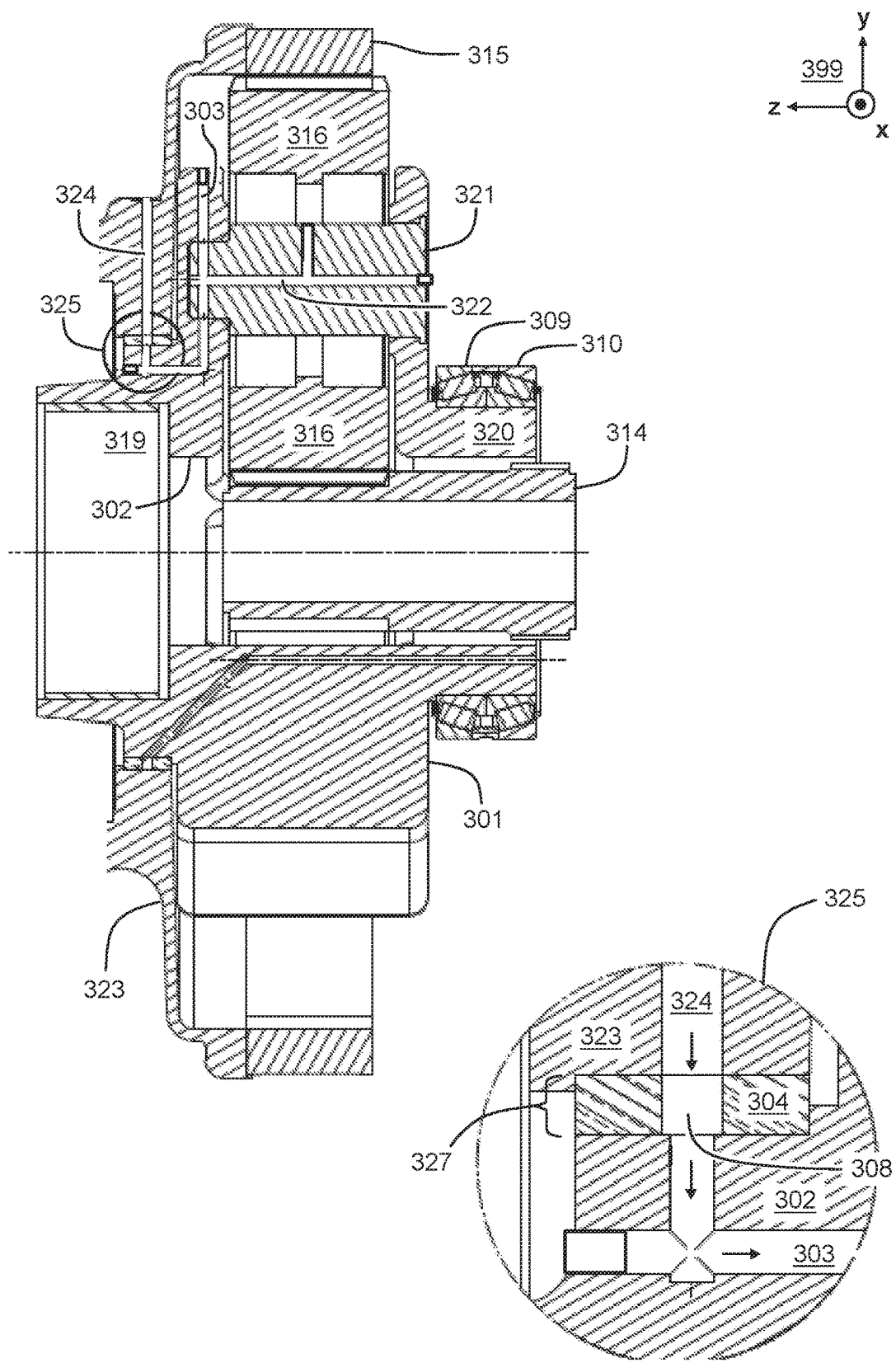
FIG. 3 illustrates a planetary gear according to an exemplifying and non-limiting embodiment of the invention.

FIG. 3 shows a section view of a planetary gear according to an exemplifying and non-limiting embodiment of the invention. The section is taken along a section plane which is parallel with the yz-plane of a coordinate system 399 and which coincides with the geometric center line of the of the planetary gear. In FIG. 3, the geometric center line is depicted with a dash-and-dot line. The planetary gear comprises a sun shaft 314, a gear ring 315, planet wheels, and a planet wheel carrier 301 according to an exemplifying embodiment of the invention for supporting the planet wheels so that the planet wheels are meshing with the sun shaft 314 and with the gear ring 315. FIG. 3 shows a section view of one of the planet wheels. The planet wheel shown in FIG. 3 is denoted with a reference 316.

The planet wheel carrier 301 comprises a carrier body 302 for supporting the shafts of the planet wheels. FIG. 3 shows a section view of the shaft of the planet wheel 316. The shaft shown in FIG. 3 is denoted with a reference 321. The carrier body 302 and the shafts of the planet wheels comprise oil channels for conducting oil to the bearings of the planet wheels. In FIG. 3, an oil channel of the carrier body 302 is denoted with a reference 303 and an oil channel of the shaft 321 of the planet wheel 316 is denoted with a reference 322. The planet wheel carrier 301 comprises a slide bearing 327 for rotatably supporting a first end 319 of the carrier body 302 with respect to a frame 323 of the planetary gear. FIG. 3 shows a magnified view of a figure portion 325 so as to illustrate the slide bearing 327. The slide bearing 327 comprises oil channels 308 for conducting oil from an oil channel 324 of the frame 323 to the oil channel 303 of the carrier body 302. A part of the oil supplied via the oil channel 324 of the frame 323 lubricates the slide bearing 327 and the rest of the oil is delivered to the planet wheel carrier 301 and thereby to the bearings of the planet wheels. Therefore, the slide bearing 327 is used as an oil supply connection which enables pressurized oil supply to the bearings of the planet wheels. The planet wheel carrier 301 comprises conical roller bearings for rotatably supporting a second end 320 of the carrier body 302 with respect to the frame 323.

In the exemplifying case illustrated in FIG. 3, the slide bearing 327 comprises a bearing bush 304 that is rotatable with respect to the frame 323 and/or with respect to the carrier body 302. The bearing bush 304 comprises radial apertures which constitute the oil channels 308 for conducting oil from the oil channel 324 of the frame 323 to the oil channel 303 of the carrier body 302. In this exemplifying case, a surface of the carrier body 302 is adapted to act as a sliding surface of the slide bearing 327 and/or a surface of the frame 323 is adapted to act as a sliding surface of the slide bearing 327. Correspondingly, an inner surface of the bearing bush 304 constitutes a sliding surface of the slide bearing and/or an outer surface of the bearing bush 304 constitutes a sliding surface of the slide bearing.

It is worth noting that the planetary gears illustrated in FIGS. 1, 2, and 3 are non-limiting examples only. For example the slide bearing supporting the planet wheel carrier may comprise two or more axially successive inner bearing bushes and a single outer bearing bush which has radial oil channels. It is also possible that the slide bearing comprises two or more axially successive outer bearing bushes and a single inner bearing bush which has radial oil channels. It is also possible that the slide bearing comprises two or more axially successive bearing bushes attached to the frame of the planetary gear and a surface of the carrier body of the planet wheel carrier is arranged to act as another sliding surface of the slide bearing. It is also possible that the slide bearing comprises a bearing bush having radial oil channels and a circumferential groove and being attached to the frame of the planetary gear, and a surface of the carrier body of the planet wheel carrier is arranged to act as another sliding surface of the slide bearing. It is also possible that the slide bearing comprises a bearing bush comprising radial oil channels and attached to the frame of the planetary gear, and a surface of the carrier body of the planet wheel carrier is arranged to act as another sliding surface of the slide bearing and the surface of the carrier body comprises a circumferential groove for receiving oil. It is also possible that one or more bearing bushes of the kind mentioned above is/are attached to the carrier body of the planet wheel carrier and a surface of the frame is arranged to act as another sliding surface of the slide bearing. As evident in light of the above-presented examples, the principle of using the above-mentioned slide bearing not only as a bearing but also as an oil supply connection from the frame to the planet wheel carrier is applicable with a number of different slide bearing structures.

In the exemplifying cases illustrated in FIGS. 1, 2, and 3, the gear ring is stationary and the planet wheel carrier and the sun shaft are rotatable. It is also possible that the sun shaft is stationary and the planet wheel carrier and the gear ring are rotatable.

The specific examples provided in the description given above should not be construed as limiting the scope and/or the applicability of the accompanied claims. Lists and groups of examples provided in the description given above are not exhaustive unless otherwise explicitly stated.

What is claimed is:

1. A planet wheel carrier for a planetary gear, the planet wheel carrier comprising:
   a carrier body for supporting shafts of planet wheels of the planetary gear, the carrier body and the shafts of the planet wheels comprising oil channels for conducting oil to bearings of the planet wheels;
   a slide bearing for rotatably supporting a first end of the carrier body with respect to a frame of the planetary gear, the slide bearing comprising at least one oil channel for conducting oil from at least one oil channel of the frame of the planetary gear to the oil channels of the carrier body; and
   one or more conical roller bearings for rotatably supporting a second end of the carrier body with respect to the frame of the planetary gear and for receiving an axial force directed to the carrier body,
   wherein the slide bearing comprises two axially successive bearing elements and an axial gap between the bearing elements constitutes the oil channel of the slide bearing.

2. The planet wheel carrier according to claim 1, wherein the slide bearing comprises a bearing bush comprising radial apertures constituting the oil channels of the slide bearing, and a surface of the carrier body constitutes a sliding surface of the slide bearing.

3. The planet wheel carrier according to claim 1, wherein the slide bearing comprises a bearing bush comprising radial apertures constituting the oil channels of the slide bearing, and an outer surface of the bearing bush constitutes a sliding surface of the slide bearing.

4. The planet wheel carrier according to claim 3, wherein an inner surface of the bearing bush constitutes another sliding surface of the slide bearing.

5. The planet wheel carrier according to claim 1, wherein the conical roller bearings comprise axially successive first and second conical roller bearings whose coning angles open towards each other.

6. The planet wheel carrier according to claim 1, wherein the carrier body comprises:
   a first end-section for supporting first ends of the shafts of the planet wheels;
   a second end-section for supporting second ends of the shafts of the planet wheels; and
   a support structure connecting the first and second end-sections to each other and located between the first and second end-sections in an axial direction and between the planet wheels in a circumferential direction of the planet wheel carrier.

7. The planet wheel carrier according to claim 1, wherein the planet wheel carrier is configured to support at least three planet wheels.

8. A planet wheel carrier for a planetary gear, the planet wheel carrier comprising:
   a carrier body for supporting shafts of planet wheels of the planetary gear, the carrier body and the shafts of the planet wheels comprising oil channels for conducting oil to bearings of the planet wheels;
   a slide bearing for rotatably supporting a first end of the carrier body with respect to a frame of the planetary gear, the slide bearing comprising at least one oil channel for conducting oil from at least one oil channel of the frame of the planetary gear to the oil channels of the carrier body; and
   one or more conical roller bearings for rotatably supporting a second end of the carrier body with respect to the frame of the planetary gear and for receiving an axial force directed to the carrier body,
   wherein at least one of sliding surfaces of the slide bearing comprises a circumferential groove and the slide bearing comprises radial apertures for conducting oil from the at least one oil channel of the frame to the circumferential groove and for conducting oil from the circumferential groove to the oil channels of the carrier body.

9. A planetary gear comprising:
   a sun shaft;
   a gear ring;
   planet wheels; and
   a planet wheel carrier for supporting the planet wheels so that the planet wheels are meshing with the sun shaft and with the gear ring,
   wherein the planet wheel carrier comprises:

a carrier body for supporting shafts of the planet wheels, the carrier body and the shafts of the planet wheels comprising oil channels for conducting oil to bearings of the planet wheels;

a slide bearing for rotatably supporting a first end of the carrier body with respect to a frame of the planetary gear, the slide bearing comprising at least one oil channel for conducting oil from at least one oil channel of the frame of the planetary gear to the oil channels of the carrier body; and one or more conical roller bearings for rotatably supporting a second end of the carrier body with respect to the frame of the planetary gear and for receiving an axial force directed to the carrier body, wherein the slide bearing comprises two axially successive bearing elements and an axial gap between the bearing elements constitutes the oil channel of the slide bearing.

10. The planetary gear according to claim 9, wherein the bearings of the planet wheels are slide bearings.

11. The planetary gear according to claim 9, wherein the bearings of the planet wheels are roller bearings.

12. A planetary gear comprising:
a sun shaft;
a gear ring;
planet wheels; and
a planet wheel carrier for supporting the planet wheels so that the planet wheels are meshing with the sun shaft and with the gear ring, wherein the planet wheel carrier comprises:
a carrier body for supporting shafts of the planet wheels, the carrier body and the shafts of the planet wheels comprising oil channels for conducting oil to bearings of the planet wheels;

a slide bearing for rotatably supporting a first end of the carrier body with respect to a frame of the planetary gear, the slide bearing comprising at least one oil channel for conducting oil from at least one oil channel of the frame of the planetary gear to the oil channels of the carrier body; and one or more conical roller bearings for rotatably supporting a second end of the carrier body with respect to the frame of the planetary gear and for receiving an axial force directed to the carrier body, wherein at least one of sliding surfaces of the slide bearing comprises a circumferential groove and the slide bearing comprises radial apertures for conducting oil from the at least one oil channel of the frame to the circumferential groove and for conducting oil from the circumferential groove to the oil channels of the carrier body.

* * * * *